United States Patent
Masuda (10) Patent No.: US 7,880,866 B2
(45) Date of Patent: Feb. 1, 2011

(54) METHOD AND DEVICE FOR MEASURING DISTANCE

(75) Inventor: Tomonori Masuda, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 198 days.

(21) Appl. No.: 12/235,835

(22) Filed: Sep. 23, 2008

(65) Prior Publication Data

US 2009/0079959 A1 Mar. 26, 2009

(30) Foreign Application Priority Data

Sep. 26, 2007 (JP) ............................. 2007-249024

(51) Int. Cl.
*G01C 3/08* (2006.01)
(52) U.S. Cl. ...................... 356/4.06; 356/4.01; 356/4.1; 356/5.01; 356/5.1
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS 4,883,358 A * 11/1989 Okada ........................ 356/463

5,856,667 A 1/1999 Spirig et al.
7,138,646 B2 11/2006 Hashimoto et al.

\* cited by examiner

*Primary Examiner*—Thomas H Tarcza
*Assistant Examiner*—Luke D Ratcliffe
(74) *Attorney, Agent, or Firm*—Sughrue Mion, PLLC (57) ABSTRACT

Erroneous measurement in distance measurement using a TOF technique is prevented. Intensity-modulated light being modulated with a constant cycle is emitted toward a subject. Reflected modulated light from the subject is received by a light receiving unit, and four types of (first to fourth) detection signals with different phases are obtained. Then, whether a difference between a first sum of the first and third detection signals and a second sum of the second and fourth detection signals is smaller than a set value is determined. If it is the case, a phase difference between the modulated light and the reflected modulated light is detected using the four detection signals. Then, a distance to the subject is calculated using the phase difference. In contrast, for any block in which the difference is not less than the set value, the phase difference is not detected and the distance is not calculated.

5 Claims, 10 Drawing Sheets

FIRST FRAME

FIG.8B

SECOND FRAME

FIRST FRAME

FIG.10B

SECOND FRAME

FIG.11A

FIRST FRAME

FIG.11B

SECOND FRAME

METHOD AND DEVICE FOR MEASURING DISTANCE

BACKGROUND OF THE INVENTION

1. Field of the Invention

The present invention relates to distance measuring method and device for measuring a distance to a subject using a modulated-light phase-difference technique, or a TOF (time of flight) technique.

2. Description of the Related Art

Distance measuring devices using a modulated-light phase-difference technique, or a TOF (time of flight) technique, for measuring a distance to a subject has conventionally been known (see, for example, U.S. Pat. Nos. 7,138,646 and 5,856,667). In the TOF technique, a distance to a subject is measured by illuminating the subject with intensity-modulated light, receiving reflected modulated light from the subject, and detecting a phase difference between the modulated light and the reflected modulated light. In the technique disclosed in the above patents, measurement values are obtained at different phases by sampling amounts of light of the reflected modulated light when the phase of the modulated light is 0°, 90°, 180° and 270°. Then, distance information to the subject to be detected is calculated based on the four types of measurement values obtained at different phases.

In the technique disclosed in the above patents, however, if external light enters the light receiving section when each detection signal is detected, the obtained detection signal represents not only the amount of the reflected modulated light, and this results in erroneous distance calculation. Further, when the four types of detection signals are obtained using multiple pixels, the pixels may receive reflected modulated light which is reflected from different positions on the subject to be measured, and this also results in erroneous distance calculation.

SUMMARY OF THE INVENTION

In view of the above-described circumstances, the present invention is directed to providing distance measuring method and device which can prevent erroneous distance measurement.

The distance measuring method of the invention includes: emitting intensity-modulated light being modulated with a constant cycle; receiving reflected modulated light from the subject when the subject is illuminated by the emitted modulated light to obtain, from the reflected modulated light, each of a first detection signal, a second detection signal, a third detection signal and a fourth detection signal at each $\pi/2$ phase of the modulated light; calculating a first sum of the first detection signal and the third detection signal and a second sum of the second detection signal and the fourth detection signal and determining whether or not a difference between the first sum and the second sum is smaller than a set value; if it is determined that the difference between the first sum and the second sum is smaller than the set value, detecting a phase difference between the modulated light and the reflected modulated light based on the obtained four types of detection signals and calculating a distance to the subject from the detected phase difference.

The distance measuring device of the invention includes: a light emitting section for emitting intensity-modulated light being modulated with a constant cycle; a light receiving section for receiving reflected modulated light from the subject when the subject is illuminated by the modulated light emitted from the light emitting section to obtain, from the reflected modulated light, each of a first detection signal, a second detection signal, a third detection signal and a fourth detection signal at each $\pi/2$ phase of the modulated light; a determining section for calculating a first sum of the first detection signal and the third detection signal and a second sum of the second detection signal and the fourth detection signal obtained by the light receiving section and determining whether or not a difference between the first sum and the second sum is smaller than a set value; and a distance calculating section for detecting a phase difference between the modulated light and the reflected modulated light based on the four types of detection signals obtained by the light receiving section and calculating a distance to the subject, if it is determined by the determining section that the difference between the first sum and the second sum is smaller than the set value.

Each detection signal may be obtained with any exposure time, as long as it is obtained at each $\pi/2$ phase (¼ cycle) of the modulated light.

The light receiving section may have any structure, as long as it obtains the four types of detection signals. For example, the light receiving section may include first light receiving elements for obtaining the first detection signal, second light receiving elements for obtaining the second detection signal, third light receiving elements for obtaining the third detection signal, and fourth light receiving elements for obtaining the fourth detection signal, and may obtain one frame image containing the four types of detection signals from the light receiving elements. In this case, the determining section determines whether or not the difference between the first sum and the second sum is smaller than the set value using the four types of detection signals obtained for each block formed by the four types of light receiving elements in the one frame image, and the distance calculating section calculates the distance for each block.

Alternatively, the light receiving section may include first light receiving elements and second light receiving elements for obtaining the detection signals of different types, and obtains the four types of detection signals by obtaining two different types of frame images, each frame image containing two types of the detection signals obtained by the first light receiving element and the second light receiving element. In this case, the determining section determines whether or not the difference between the first sum and the second sum is smaller than the set value using the four types of detection signals obtained for each block formed by the first light receiving element and the second light receiving element, and the distance calculating section calculates the distance for each block.

Further alternatively, the light receiving section may include two-dimensionally arrayed light receiving elements, and obtains the four types of detection signals by obtaining four frame images each containing one type of the four types of detection signals obtained by the light receiving elements. In this case, the determining section determines whether or not the difference between the first sum and the second sum is smaller than the set value using the four types of detection signals obtained for each light receiving element, and the distance calculating section calculates the distance for each light receiving element.

The determining section may have a predetermined set value, may set, as the set value, a predetermined ratio of a value of larger one of the first sum and the second sum, or may set, as the set value, a predetermined ratio of an average of the first sum and the second sum.

DESCRIPTION OF THE PREFERRED EMBODIMENTS

Figure 1:
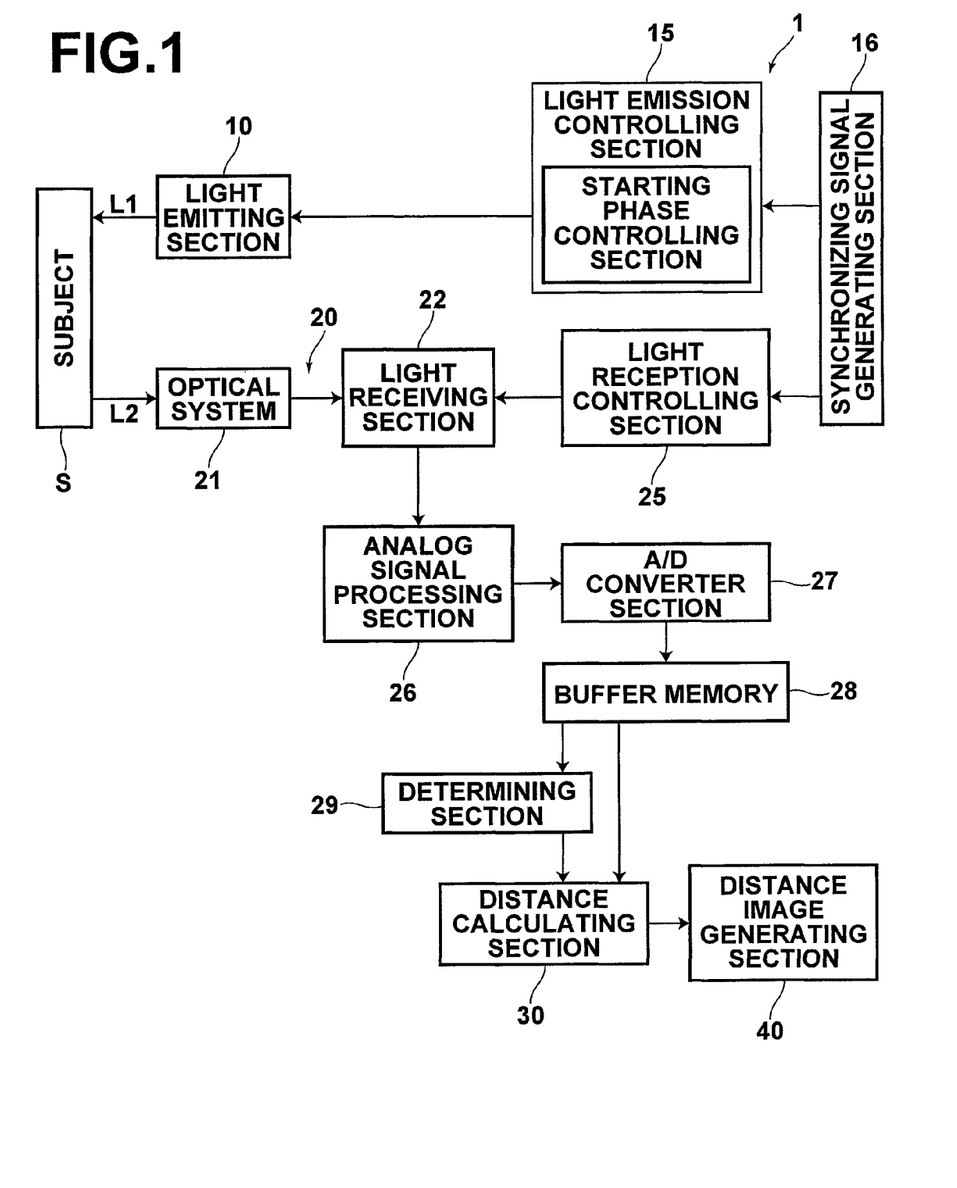
FIG. 1 is a block diagram illustrating a first embodiment of a distance measuring device of the present invention.

Now, a preferred embodiment of a distance measuring device of the present invention will be described in detail with reference to the drawings. FIG. 1 is a block diagram illustrating the preferred embodiment of the distance measuring device of the invention. The distance measuring device 1 measures a distance to the subject using a so-called phase difference detection technique, or TOF technique, and includes a light emitting section 10, a light receiving unit 20, a distance calculating section 30, a distance image generating section 40, and the like.

Figure 2:
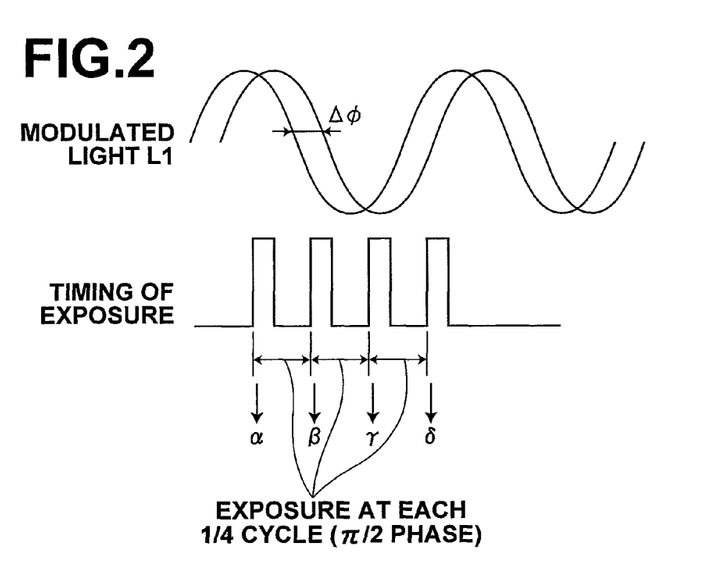
FIG. 2 is a graph illustrating one example of an emitted modulated light and a reflected modulated light from the subject in the distance measuring device of FIG. 1, FIGS. 3A-3C are schematic diagrams illustrating examples of light receiving elements in the distance measuring device of FIG. 1.

The light emitting section 10 is formed, for example, by an LED array, which continuously emits modulated light L1 toward the subject. Light intensity of the modulated light L1 is modulated with a constant cycle T (for example, T=0.5 ms, frequency is 20 Hz), as shown in FIG. 2. Operation of the light emitting section 10 is controlled by a light emission controlling section 15.

The light receiving unit 20 receives reflected modulated light L2 from the subject S when the modulated light L1 illuminates the subject S, and obtains a first detection signal $\alpha$, a second detection signal $\beta$, a third detection signal $\gamma$ and a fourth detection signal $\delta$. Specifically, the light receiving unit 20 includes an optical system 21, a light receiving section 22, and the like. The optical system 21 is formed by imaging optical lenses, an aperture diaphragm, etc., and images the reflected modulated light L2 from the subject on the light receiving section 22. The light receiving section 22 receives the reflected modulated light L2 imaged by the optical system 21. Timing of exposure and exposure time are controlled by the light reception controlling section 25.

Figure 3A:
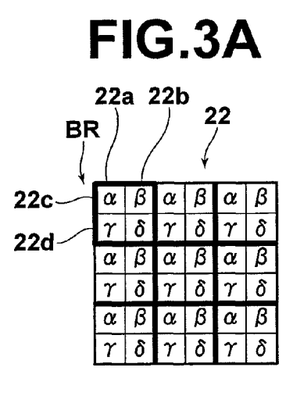
Figure 3B:
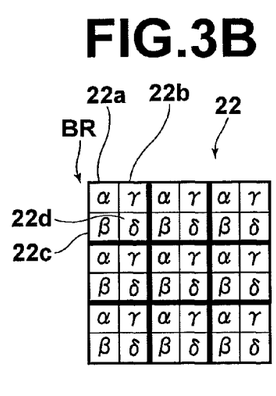
Figure 3C:
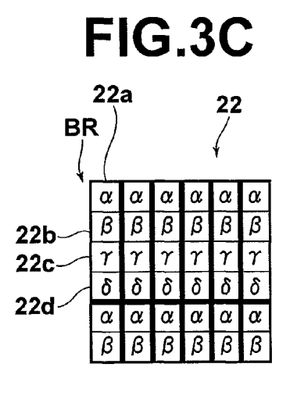
Figure 4:
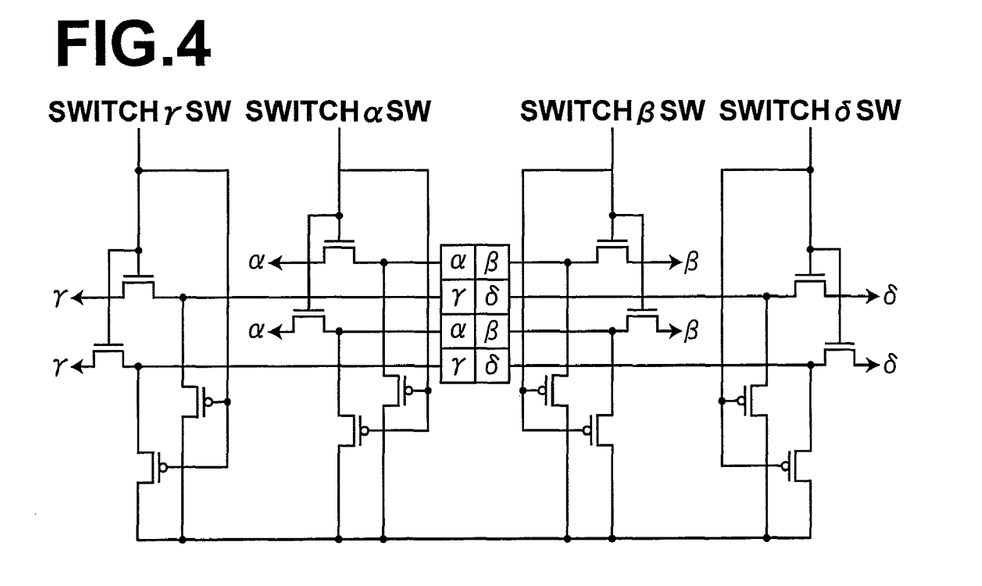
FIG. 4 is a schematic diagram illustrating a switching structure in the light receiving elements of FIGS. 3A-3C.

The light receiving section 22 is formed, for example, by a CCD or a CMOS sensor. FIGS. 3A-3C are schematic diagrams illustrating one example where the light receiving element is formed by a CCD. The light receiving section 22 shown in FIGS. 3A-3C includes first light receiving elements 22a for obtaining the first detection signal $\alpha$, second light receiving elements 22b for obtaining the second detection signal $\beta$, third light receiving elements 22c for obtaining the third detection signal $\gamma$, and fourth light receiving elements 22d for obtaining the fourth detection signal $\delta$. Exposure time and timing of exposure of the light receiving elements 22a-22d are controlled by the light reception controlling section 25. Specifically, the light reception controlling section 25 controls switching operations of switching elements $\alpha$SW, $\beta$SW, $\gamma$SW and $\delta$SW, as shown in FIG. 4, so that each of the light receiving elements 22a-22d outputs corresponding one of the four types of detection signals $\alpha$-$\delta$.

At this time, a synchronizing signal is inputted from a synchronizing signal generating section 16 to the light emission controlling section 15 and the light reception controlling section 25 at each $\pi/2$ phase, for example, to synchronize emission of the modulated light L1 with reception of the reflected modulated light L2. Then, at the light receiving section 22, each of the light receiving elements 22a-22d carries out exposure at timing when the synchronizing signal is inputted. On the other hand, the light emitting section 10 emits the modulated light L1 with shifting the phase to start emission, as 0°, 90°, 180°, 270°, according to the timing when the synchronizing signal is inputted. In this manner, the light receiving elements 22a-22d of the light receiving section 22 obtain the four types of detection signals $\alpha$-$\delta$ with different phases.

The light reception controlling section 25 further controls the light receiving section 22 to output the four types of detection signals $\alpha$-$\delta$ as one frame image. That is, the frame image obtained from the light receiving section 22 contains the four types of detection signals $\alpha$-$\delta$. The outputted frame image is subjected to analog signal processing by an analog signal processing section 26 and A/D conversion by an A/D converter section 27, and then stored in a buffer memory 28.

Figure 5:
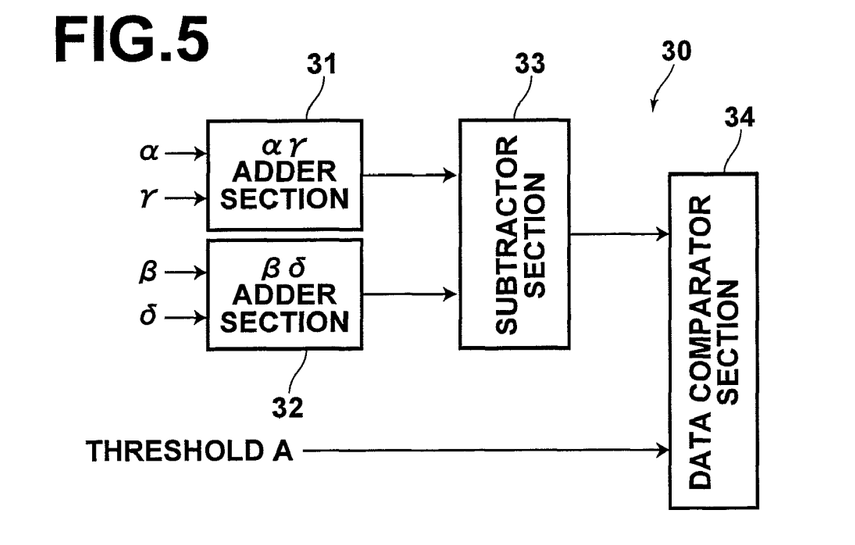
FIG. 5 is a block diagram illustrating one example of a determining section in the distance measuring device of FIG. 1.

A determining section 29 calculates a first sum W1 of the first detection signal $\alpha$ and the third detection signal $\gamma$ and a second sum W2 of the second detection signal $\beta$ and the fourth detection signal $\delta$ obtained by the light receiving section 22, and determines whether or not a difference $\Delta$W between the first sum W1 and the second sum W2 is smaller than a set value A. Specifically, as shown in FIG. 5, the determining section 29 includes an $\alpha\gamma$ adder section 31 for calculating the first sum W1, a $\beta\delta$ adder section 32 for calculating the second sum W2, a subtractor section 33 for calculating the difference $\Delta$W between the first sum W1 and the second sum W2, and a data comparator section 34 for comparing the calculate difference ΔW with the threshold A.

Since the intensity of the modulated light L1 is modulated with the constant cycle T, the intensity of the reflected modulated light L2 is also modulated at the constant cycle. Since each of the four types of detection signals α–δ is obtained at each π/2 phase (¼ cycle) of the modulated light L1, the first sum W1 and the second sum W2 are, in principle, the same, as shown by equations (1)-(5) below:

$$\alpha = \int_{\theta}^{\theta+r} \{q(p\sin x + m) + n\} \quad (1)$$
$$= pq\cos(\theta + r) - pq\cos\theta + r(mq + n)$$

$$\beta = \int_{\theta-\frac{\pi}{2}}^{\theta+\frac{\pi}{2}+r} \{q(p\sin x + m) + n\} \quad (2)$$
$$= pq\cos\left(\theta + \frac{\pi}{2} + r\right) - pq\cos\left(\theta + \frac{\pi}{2}\right) + r(mq + n)$$
$$= pq\sin(\theta + r) - pq\sin\theta + r(mq + n)$$

$$\gamma = \int_{\theta+\pi}^{\theta+\pi+r} \{q(p\sin x + m) + n\} \quad (3)$$
$$= pq\cos(\theta + \pi + r) - pq\cos(\theta + \pi) + r(mq + n)$$
$$= pq\cos(\theta + r) - pq\cos\theta + r(mq + n)$$

$$\delta = \int_{\theta-\frac{3\pi}{2}}^{\theta+\frac{3\pi}{2}+r} \{q(p\sin x + m) + n\} \quad (4)$$
$$= pq\cos\left(\theta + \frac{3\pi}{2} + r\right) - pq\cos\left(\theta + \frac{3\pi}{2}\right) + r(mq + n)$$
$$= pq\sin(\theta + r) - pq\sin\theta + r(mq + n)$$

$$\alpha + \gamma = \beta + \delta = 2r(m + n) \quad (5)$$

In equations (1)-(5) above, the reflected modulated light L2=q(sin x+m), q represents a reflectance of the subject, and n represents stationary external light.

In contrast, if the four types of detection signals α–δ are obtained in a state where external light enters the light receiving section 22, for example, the obtained detection signals are larger by an amount corresponding to the external light component. In another case, if the detection signals are obtained from the reflected modulated light which is reflected from different positions of the subject, any of the detection signals reflected from a position with a different reflectance q is larger (or smaller) than the other detection signals. That is, the relationship of the above equation (5) is established when the four types of detection signals α–δ are obtained in the normal state. In contrast, α+γ≠β+δ when the four types of detection signals α–δ are obtained in the abnormal state.

Therefore, the determining section 29 calculates the first sum W1 and the second sum W2, and determines whether or not the difference ΔW between the sums W1 and W2 is smaller than the set value A. If the difference ΔW is smaller than the set value A, the determining section 29 determines that the normal detection signals are obtained. In contrast, if the difference ΔW is not less than the set value A, the determining section 29 determines that abnormal detection signals are obtained due to some external factor.

In a case where the four types of detection signals α–δ are obtained as the one frame image, as shown in FIGS. 3A-3C, the determining section 29 carried out determination on the four types of detection signals α–δ for each block BR used for calculating a distance d, which will be described later.

The distance calculating section 30 detects a phase difference Δφ between the modulated light L1 and the reflected modulated light L2 using the first detection signal α, the second detection signal β, the third detection signal γ and the fourth detection signal δ obtained by the light receiving section 22, to calculate the distance d, only when the determining section 29 has determined that the difference ΔW is smaller than the set value A. That is, the phase of the detected reflected modulated light L2 is different from the phase of the modulated light L1 by an amount corresponding to the distance to the subject (see FIG. 2), and therefore the distance calculating section 30 detects this phase difference Δφ. It should be noted that, if the phase difference between the modulated light L1 and the reflected modulated light L2 is 2π, the modulated light L1 and the reflected modulated light L2 have the same phase, and therefore, the modulation wavelength λ of the modulated light L1 is equal to the maximum measurable distance.

Specifically, when the phase of the modulated light L1 and the phase of the reflected modulated light L2 are different from each other, the phase difference Δφ appears as differences between signal values of the four types of detection signals α–δ. Therefore, the distance calculating section 30 can detect the phase difference Δφ according to equation (6) below:

$$\Delta\phi = \arctan\left(\frac{\alpha - \gamma}{\beta - \delta}\right) \quad (6)$$

The distance calculating section 30 detects the phase difference Δφ for each block BR using the four types of detection signals α–δ obtained by the adjacent four light receiving elements 22a-22d, which form each block BR in the light receiving section 22 as shown in FIGS. 3A-3C.

Then, the distance calculating section 30 calculates the distance d to the subject from the phase difference Δφ detected for each block BR. The distance d to the subject S can be expressed as equation (7) below:

$$d = c\Delta\phi/4\pi f \quad (7),$$

wherein c represents a velocity of light and f represents a frequency (f=1/T) of the modulated light L1. The distance calculating section 30 calculates the distance d to the subject by assigning the phase difference Δφ detected by the distance calculating section 30 to equation (7). It should be noted that, if the determining section 29 has determined that the difference is not less than the set value A, the distance calculating section 30 does not detect the phase difference Δφ since it is impossible to correctly detect the phase difference and calculate the distance.

The distance image generating section 40 generates a distance image using the distance d calculated for each block BR by the distance calculating section 30. It should be noted that, when the distance image is generated, the distance d may not have been calculated for some blocks BR according to the determination by the determining section 29. In this case, the distance image generating section 40 interpolates the pixel values of the distance image according to a known pixel interpolation method, such as spline interpolation.

Figure 6:
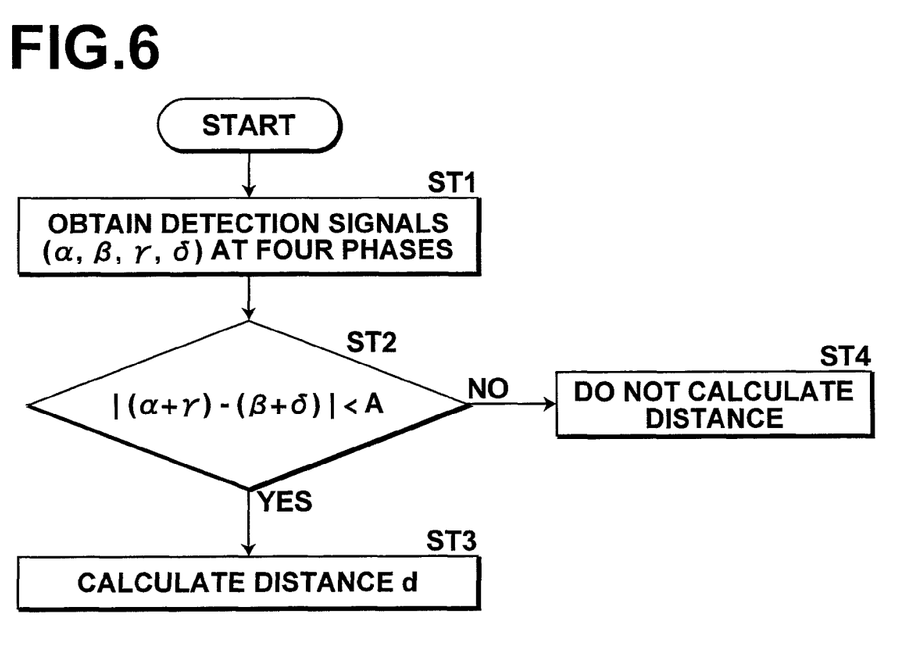
FIG. 6 is a flow chart illustrating a preferred embodiment of a distance measuring method of the invention.

FIG. 6 is a flow chart illustrating a preferred embodiment of a distance measuring method of the invention. Now, the distance measuring method will be described with reference to FIGS. 1 to 6. First, the modulated light L1 having the intensity modulated with the constant cycle T is emitted from the light emitting section 10 toward the subject S. Then, the reflected modulated light L2 reflected from the subject S is received by the light receiving unit 20. At this time, the timing to start the phase modulation of the modulated light L1 and the timing of exposure are controlled based on the synchronizing signal generated by the synchronizing signal generating section 16, and the first detection signal α, the second detection signal β, the third detection signal and the fourth detection signal δ are obtained by the light receiving elements 22a-22d (step ST1).

Subsequently, the determining section 29 determines whether or not the difference ΔW between the first sum W1 and the second sum W2 is smaller than the set value A (step ST2). If the difference ΔW is smaller than the set value A, the distance calculating section 30 detects the phase difference Δφ between the modulated light L1 and the reflected modulated light L2 according to equation (6) above using the four types of detection signals α–δ, and then calculates the distance d to the subject for each block BR according to equation (7) above using the phase difference Δφ (step ST3). Then, the distance image generating section 40 generates the distance image P. In contrast, if there is any block BR in which the difference ΔW is not less than the set value A, the distance calculating section 30 does not detect the phase difference Δφ to calculate the distance for that block BR (step ST4).

As described above, if any of the four types of detection signals is an abnormal signal, such as a detection signal which is obtained in a state where external light enters the light receiving section 22 or a detection signal which is obtained from the reflected modulated light L2 reflected from a different position of the subject, the distance is not calculated, thereby preventing erroneous distance measurement.

In particular, since the light receiving section 22 receives different ones of detection signals α–δ at the light receiving elements 22a-22d, as shown in FIGS. 3A-3C, the distance image of one frame can be generated by obtaining the one frame image from the light receiving section 22. Therefore, the distance image can be generated speedily.

Figure 7:
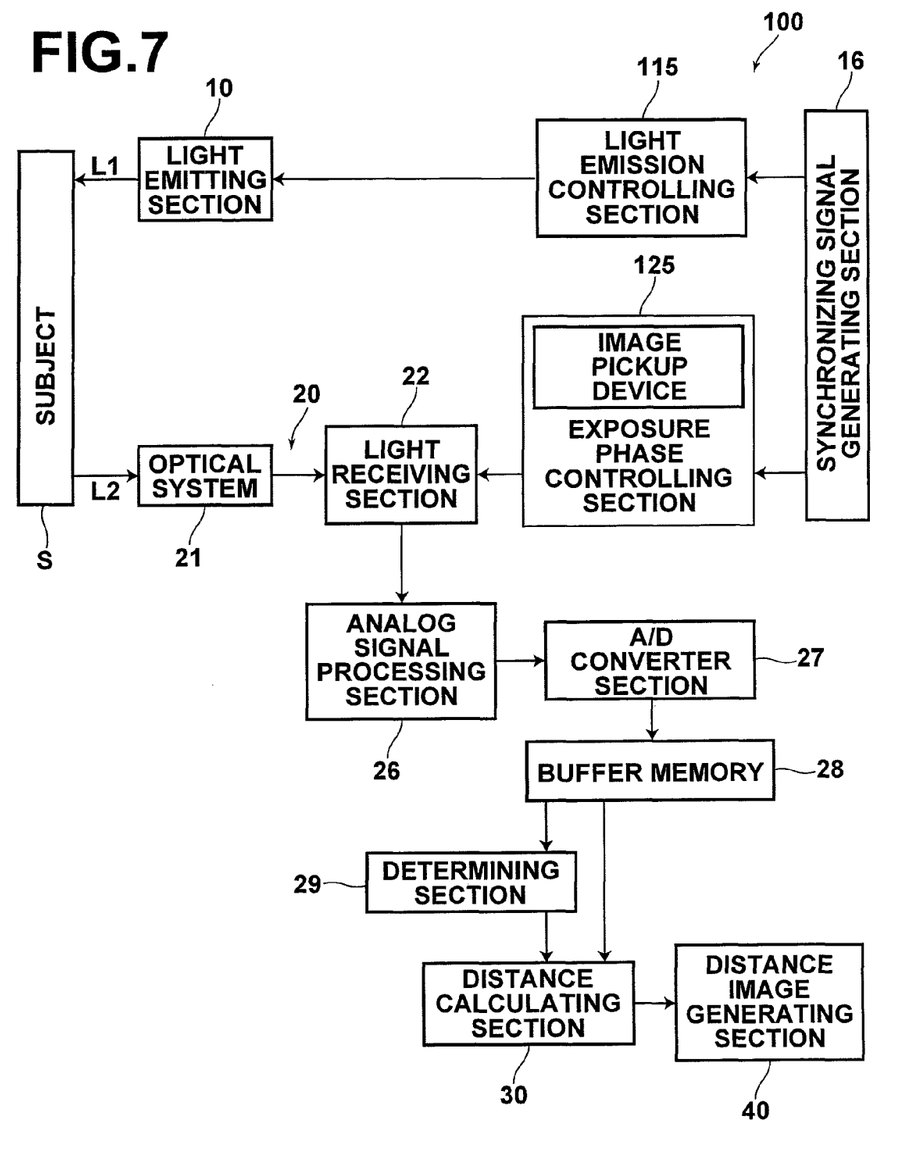
FIG. 7 is a block diagram illustrating another embodiment of the distance measuring device of the invention.

It should be noted that, in the example shown in FIG. 1, the light receiving section 22 carries out exposure at constant light reception timing, and the light emitting section 10 emits the modulated light L1 according to the light reception timing of the light receiving section 22. However, as shown in FIG. 7, the light emitting section 10 may continuously emit the modulated light L1 at a constant cycle, and the light reception timing may be controlled so that the light receiving section 22 detects the detection signals at a predetermined cycle (from predetermined phases).

FIGS. 8A-13 schematically illustrate another embodiment of the light receiving section to be used in the distance measuring device of the invention. Now, light receiving sections 122, 222, 322 and 422 will be described with reference to FIGS. 8A-13. It should be noted that the light receiving section 122, 222, 322 or 422 shown in FIGS. 8A-13 is applied in place of the light receiving section 22 of the distance measuring device 1 shown in FIG. 1.

The light receiving sections 122, 222 and 322 shown in FIGS. 8A-11 respectively include first light receiving elements and second light receiving elements, and obtain the four types of detection signals by obtaining two frame images, each containing two types of detection signals obtained by the first and second light receiving elements.

Figure 8A:
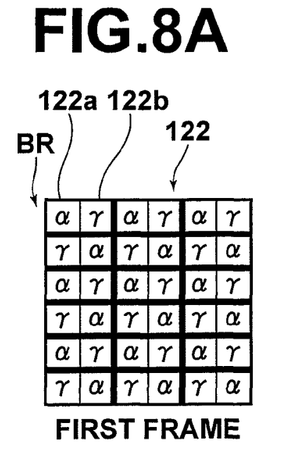
FIGS. 8A and 8B are schematic diagrams illustrating another embodiment of the light receiving elements in the distance measuring device of the invention.
Figure 8B:
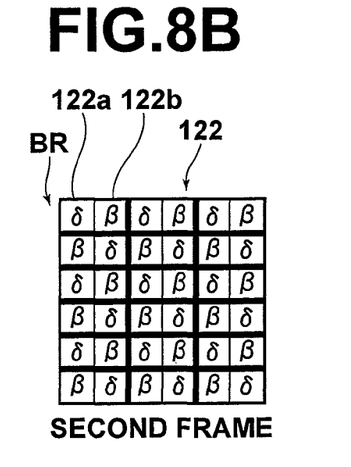
Figure 9:
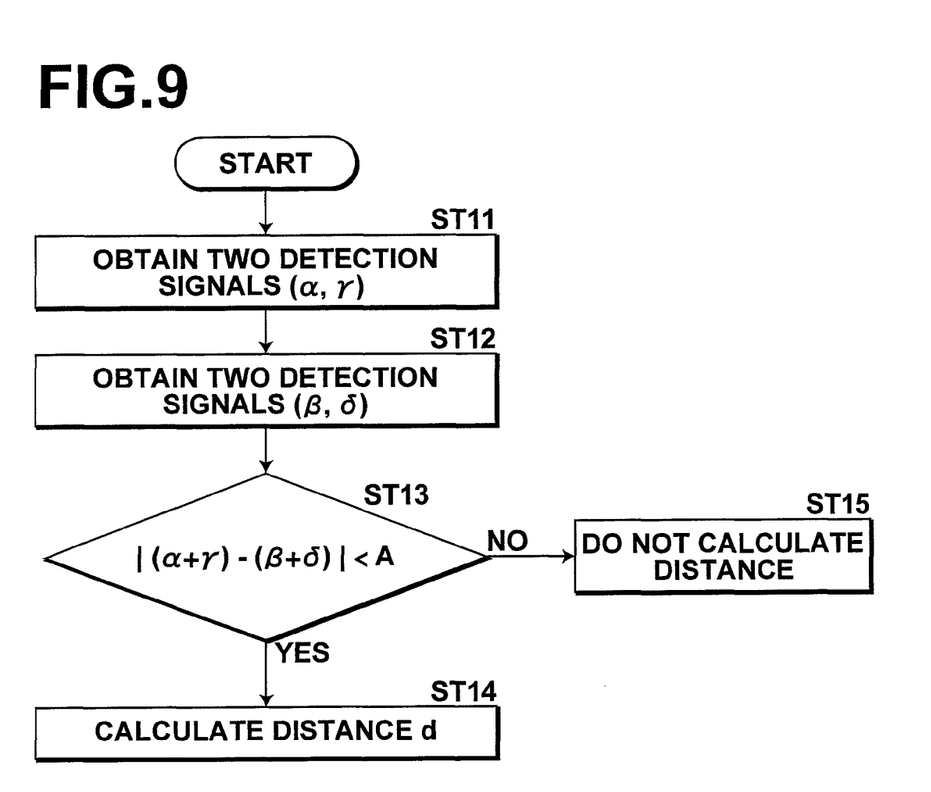
FIG. 9 is a flow chart illustrating one example of the distance measuring method when the light receiving elements of FIGS. 8A and 8B are used.

Specifically, the light receiving section 122 shown in FIGS. 8A and 8B includes first light receiving elements 122a for obtaining the first detection signal α and the third detection signal γ and second light receiving elements 122b for obtaining the second detection signal β and the fourth detection signal δ, where the adjacent first and second light receiving elements 122a and 122b form one block. Then, as shown in FIG. 9, the light receiving section 122 obtains the first detection signal α and the third detection signal γ from the first frame image, for example (step ST11, see FIG. 8A), and obtains the second detection signal β and the fourth detection signal δ from the second frame image (step ST12, see FIG. 8B).

Subsequently, the determining section 29 calculates the first sum W1 from the first frame image and the second sum W2 from the second frame image, and then determines, for each block BR, whether or not the difference ΔW between the first sum W1 and the second sum W2 is smaller than the set value A (step ST13). If the determining section 29 has determined that the difference ΔW is smaller than the set value A, the distance calculating section 30 detects the phase difference Δφ and the distance calculating section 30 calculates the distance d (step ST14). In contrast, for any block BR in which the difference ΔW is not less than the set value A, the phase difference Δφ is not detected and the distance d is not calculated (step ST15).

As described above, since the first detection signal α and the third detection signal γ are obtained from the first frame image and the second detection signal β and the fourth detection signal δ are obtained from the second frame image, the distance image can be generated by obtaining the two frame images. Therefore, the distance image can be generated speedily. Further, since the distance d for each block is calculated from a light receiving area of the two light receiving elements 122a and 122b, the distance image can be generated with higher resolution.

Figure 10A:
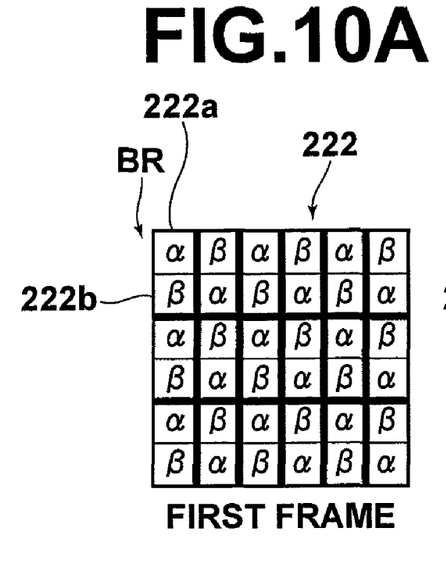
FIGS. 10A and 10B are schematic diagrams illustrating yet another embodiment of the light receiving elements in the distance measuring device of the invention.
Figure 10B:
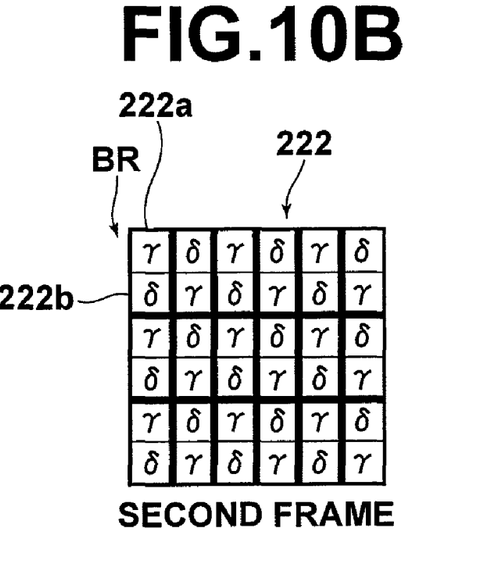
Figure 11A:
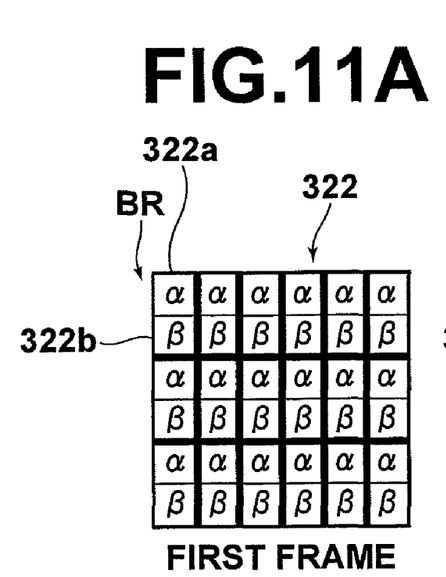
FIGS. 11A and 11B are schematic diagrams illustrating still another embodiment of the light receiving elements in the distance measuring device of the invention.
Figure 11B:
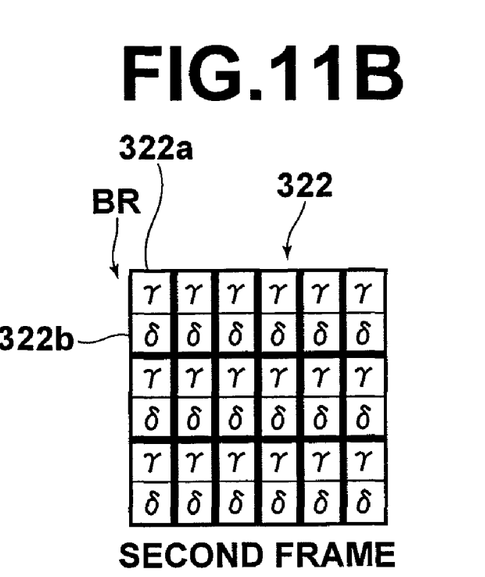
Figure 12A:
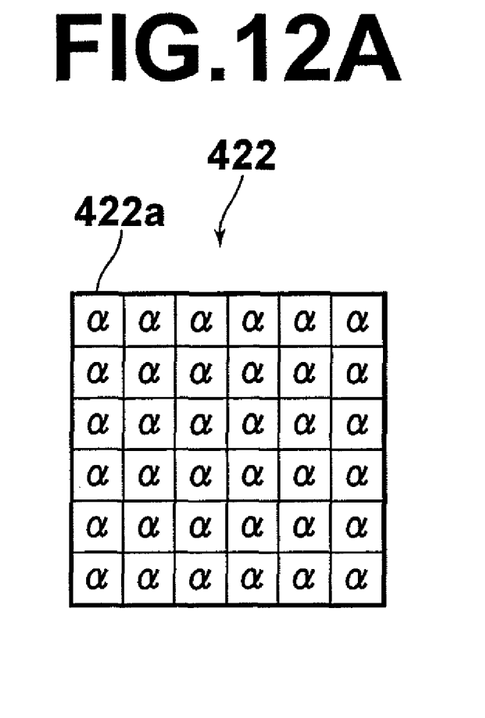
FIGS. 12A-12D are schematic diagrams illustrating further embodiment of the light receiving elements in the distance measuring device of the invention.
Figure 12B:
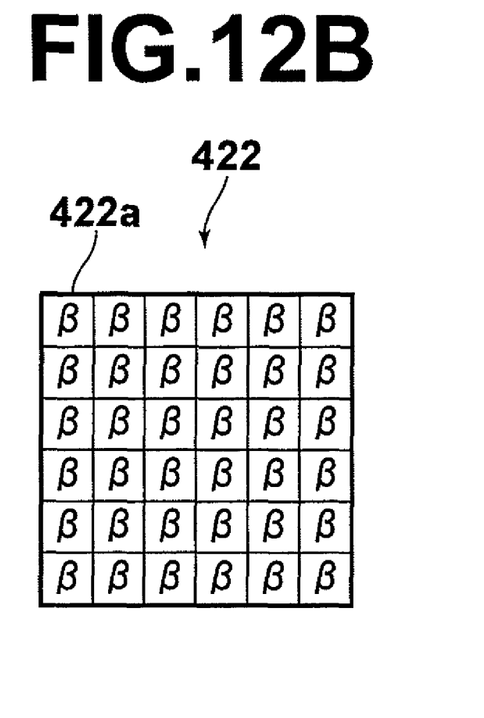
Figure 12C:
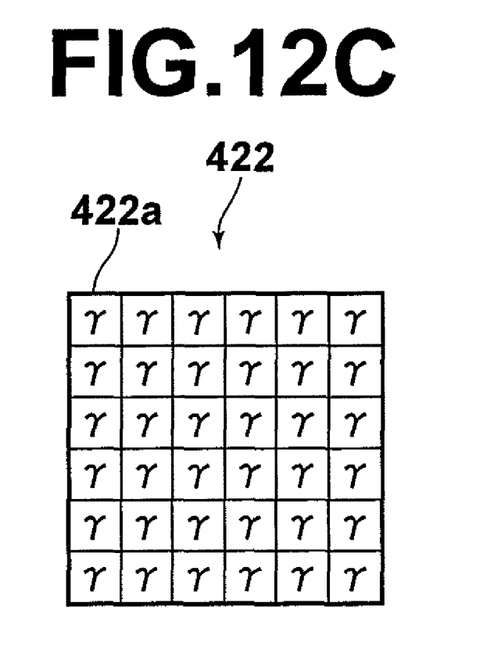
Figure 12D:
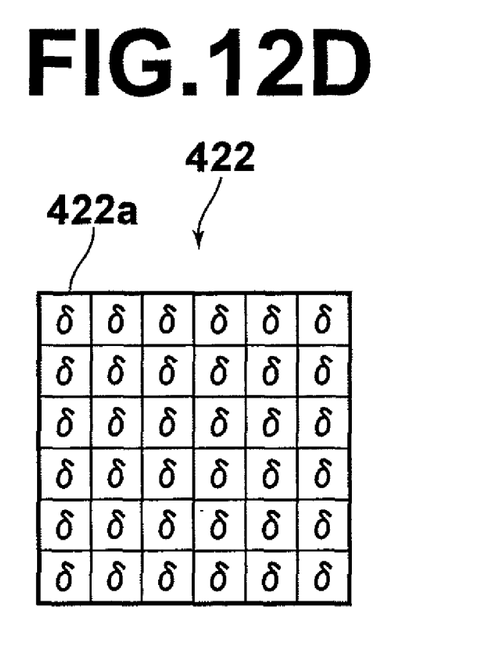

In the example shown in FIGS. 8A and 8B, the first detection signal α and the third detection signal γ are obtained in the first frame and the second detection signal β and the fourth detection signal δ are obtained in the second frame. However, the first detection signal α and the second detection signal β may be obtained in the first frame image, as shown in FIGS. 10A and 11A, and the third detection signal γ and the fourth detection signal 5 may be obtained in the second frame image as shown in FIGS. 10B and 11B. It should be noted that first light receiving elements 222a and second light receiving elements 222b shown in FIGS. 10A and 10B are alternately arranged in the horizontal and vertical directions. First light receiving elements 322a and second light receiving elements 322b shown in FIGS. 11A and 11B are arranged in stripes along the horizontal direction, and in this case, the individual detection signals α–δ can be obtained by obtaining the frame images (field images) using so-called field interlace.

As shown in FIGS. 12A-12D, the light receiving section 422 includes two-dimensionally arrayed light receiving elements 422a, and obtains the four types of detection signals α–δ by obtaining four frame images each containing one of the four types of detection signals obtained by each light receiving element 422a. It should be noted that, in FIGS. 12A-12D, each light receiving element 422a forms one block BR.

Figure 13:
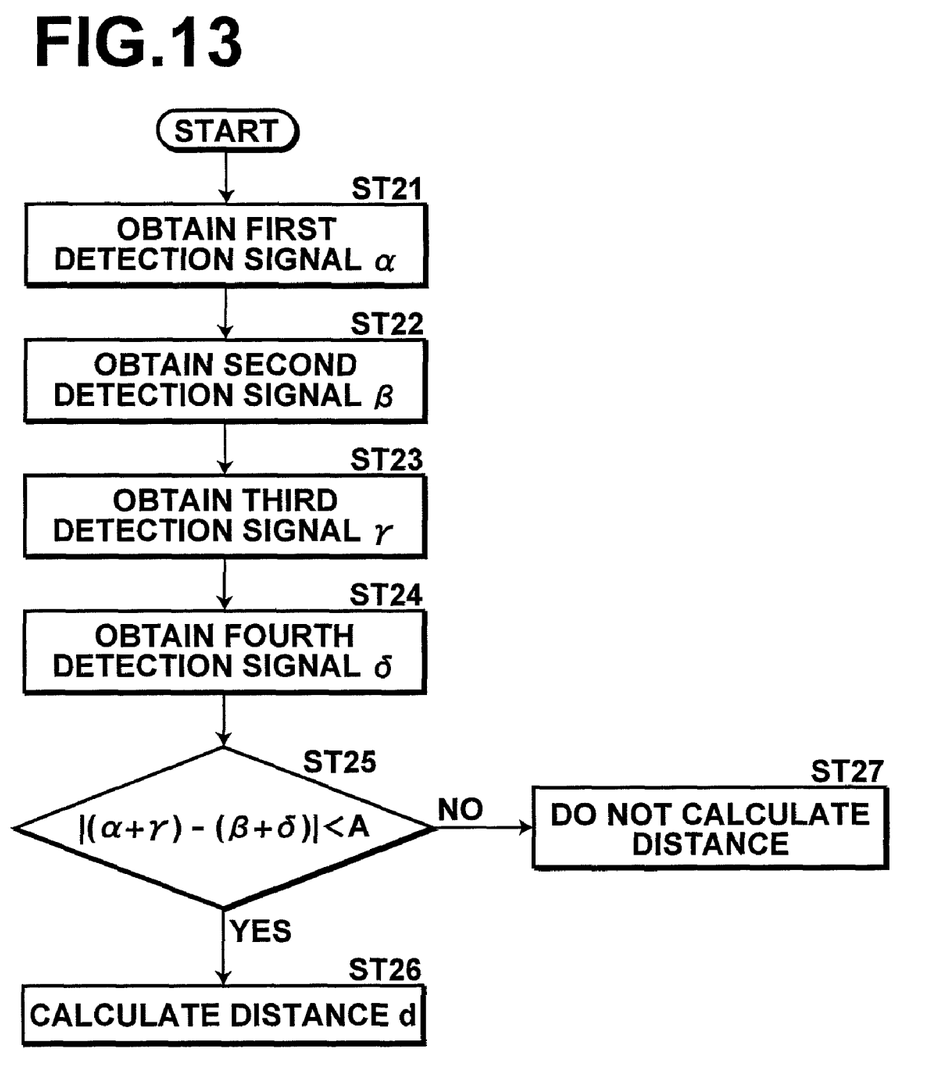
FIG. 13 is a flowchart illustrating one example of the distance measuring method when the light receiving elements of FIGS. 12A-12D are used.

Specifically, as shown in FIG. 13, each light receiving element 422a of the light receiving section 422 obtains the first detection signal α, the second detection signal β, the third detection signal γ or the fourth detection signal δ in each frame image (steps ST21-ST24, see FIGS. 12A-12D). Subsequently, the determining section 29 determines, for each light receiving element 422a, whether or not the difference ΔW between the first sum W1 and the second sum W2 is smaller than the set value A (step ST25). If the difference ΔW is smaller than the set value A, the phase difference Δφ is detected and the distance d is calculated (step ST26). In contrast, for any light receiving element 422a in which the difference ΔW is not less than the set value A, the phase difference Δφ is not detected and the distance d is not calculated (step ST27).

As described above, since the four types of detection signals α–δ are obtained for each light receiving element 422a and the distance d is calculated for each light receiving element 422a, the distance image can be generated with the highest resolution.

Figure 14:
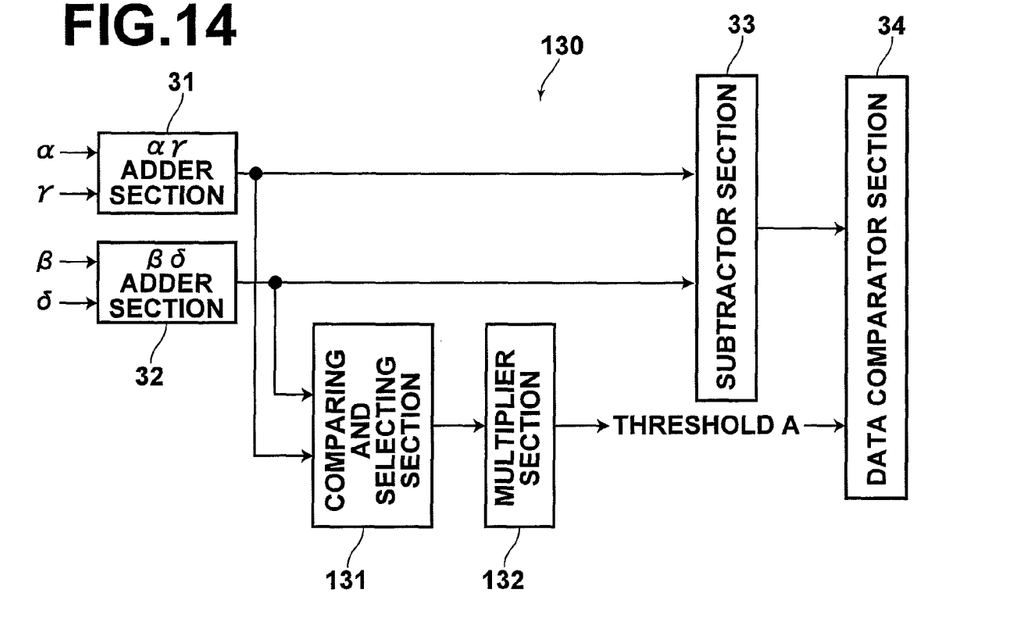
FIG. 14 is a block diagram illustrating another example of the determining section in the distance measuring device of the invention.

FIG. 14 is a schematic diagram illustrating another embodiment of the determining section in the distance measuring device of the invention. Now, a determining section 130 will be described with reference to FIG. 14. It should be noted that components of the determining section 130 shown in FIG. 14 which are the same as those in the determining section 29 shown in FIG. 5 are designated by the same reference symbols and are not described in detail. A difference between the determining section 130 of FIG. 14 and the determining section 29 of FIG. 5 lies in how the set value A is set.

As shown in FIG. 14, the determining section 130 includes a comparing and selecting section 131 and a multiplier section 132. The comparing and selecting section 131 selects larger one of the first sum W1 and the second sum W2, and the multiplier section 132 sets, as the set value A, a predetermined ratio of the value of the sum selected by the comparing and selecting section 131. It should be noted that, although the comparing and selecting section 131 is provided in the example shown in FIG. 14, the comparing and selecting section 131 may be omitted and the multiplier section 132 may set, as the set value A, a predetermined ratio of an average of the first sum W1 and the second sum W2. The set value A is set for each block BR.

Figure 15:
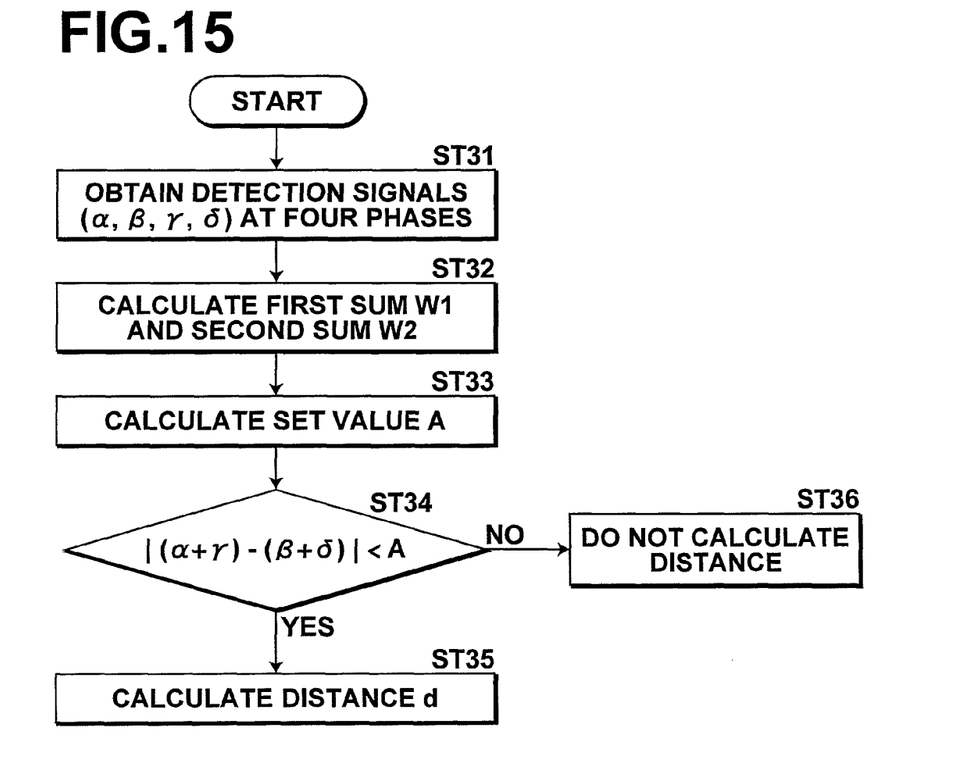
FIG. 15 is a flowchart illustrating one example of the distance measuring method when the determining section of FIG. 14 is used.

Therefore, as shown in FIG. 15, the four types of detection signals α–δ are obtained (step ST31), and the first sum W1 and the second sum W2 are calculated for each block BR (step ST32). Then, the predetermined ratio of the value of the larger one of the first sum W1 and the second sum W2 or the predetermined ratio of the average of the first sum W1 and the second sum W2 is calculated as the set value A (step ST33). Subsequently, the determining section 130 determines, for each block BR, whether or not the difference ΔW between the first sum W1 and the second sum W2 is smaller than the set value A (step ST34). If the difference ΔW is smaller than the set value A, the phase difference Δφ is detected and the distance d is calculated (step ST35). In contrast, for any block BR in which the difference ΔW is not less than the set value A, the phase difference Δφ is not detected and the distance d is not calculated (step ST36).

In this manner, the set value A can be set depending on signal values (luminance values) of the actually obtained four types of detection signals α–δ, and this provides an appropriate set value A in such a case where noise, such as shot noise, which has larger variation correspondingly to the amount of exposure is present.

According to the above-described embodiments, the intensity-modulated light L1 being modulated with the constant cycle T is emitted, and the reflected modulated light L2 from the subject S when the subject S is illuminated by the emitted modulated light L1 is received to obtain, from the reflected modulated light L2, each of the first detection signal α, the second detection signal β, the third detection signal γ and the fourth detection signal δ at each π/2 phase of the modulated light L1. Then, the first sum W1 of the first detection signal α and the second detection signal γ, and the second sum W2 of the second detection signal β and the fourth detection signal δ are calculated, and determination is made as to whether or not the difference ΔW between the first sum W1 and the second sum W2 is smaller than the set value A. If it is determined that the difference ΔW between the first sum W1 and the second sum W2 is smaller than the set value A, the phase difference Δφ between the modulated light L1 and the reflected modulated light L2 is detected using the four types of detection signals α–δ obtained by the light receiving section 22, and the distance d to the subject is calculated from the detected phase difference Δφ. In this manner, if any of the four types of detection signals α–δ is an abnormal signal, such as a detection signal which is obtained in a state where external light enters the light receiving section 22 or a detection signal which is obtained from the reflected modulated light L2 being reflected from a different position of the subject S, the distance is not calculated, thereby preventing erroneous distance measurement.

It should be noted that, as shown in FIGS. 3A-3C, in the case where the light receiving section 22 includes the first light receiving elements 22a for obtaining the first detection signal α, the second light receiving elements 22b for obtaining the second detection signal β, the third light receiving elements 22c for obtaining the third detection signal γ, and the fourth light receiving elements 22d for obtaining the fourth detection signal δ, and obtains the detection signals α–δ from the light receiving elements 22a-22d as one frame image, the determining section 29 determines whether or not the difference ΔW between the first sum W1 and the second sum W2 is smaller than the set value A using the four types of detection signals α–δ obtained for each block BR formed by the four light receiving elements 22a-22d in the one frame image, and the distance calculating section 30 calculates the distance for each block BR, the distance can be calculated from the one frame image, thereby allowing speeding up of the distance calculation.

Further, as shown in FIGS. 8A-11B, in the case where the light receiving section 122, 222 or 322 includes first light receiving elements 122a, 222a or 322a and second light receiving elements 122b, 222b or 322b, and obtains the four types of detection signals α–δ by obtaining frame images each containing two types of detection signals, such as frame images respectively containing the detection signals (α, γ) and (β, δ) or frame images respectively containing the detection signals (α, β) and (γ, δ), obtained by the first light receiving elements 122a, 222a or 322a and the second light receiving elements 122b, 222b or 322b and obtaining the two different types of the frame images, the determining section 29 determines whether or not the difference ΔW between the first sum W1 and the second sum W2 is smaller than the set value A using the four types of detection signals α–δ obtained for each block BR formed by the first light receiving element 122a, 222a or 322a and the second light receiving element 122b, 222b or 322b, and the distance calculating section 30 calculates the distance for each block BR, the distance can be calculated for each block of two pixels from the two frame images, thereby allowing speedy generation of the distance image with a higher resolution.

Furthermore, as shown in FIGS. 12A-12D and 13, in the case where the light receiving section 422 includes the two-dimensionally arrayed light receiving elements 422a, and obtains each of the detection signals α–δ as one frame image from the light receiving elements 422a, the determining section 29 calculates the first sum W1 and the second sum W2 for each light receiving element 422a using the total of four frame images obtained for the detection signals α–δ and determines whether or not the difference ΔW between the first sum W1 and the second sum W2 is smaller than the set value A, and the distance calculating section 30 detects the phase difference Δφ for each light receiving element 422a using the four frame images, the distance can be calculated by obtaining the four types of detection signals α–δ from each one of the light receiving elements 422a, thereby allowing generation of the distance image with a higher resolution.

The present invention is not limited to the above-described embodiments. For example, although the distance image is generated in the above-described embodiments, the invention is also applicable to the case where the distance to the subject is calculated and outputted without generating the distance image.

Further, the pattern in which the light receiving elements 22a-22d are arranged may be different from those shown in FIGS. 3A-3C as long as the four types of detection signals α–δ can be obtained. Preferably, the four light receiving elements 22a-22d are adjacent to each other to calculate the distance d from the reflected modulated light L2 which is reflected from the substantially same position or adjacent positions on the subject.

According to the distance measuring method and device of the invention, intensity-modulated light being modulated with a constant cycle is emitted. Reflected modulated light from the subject when the subject is illuminated by the emitted modulated light is received to obtain, from the reflected modulated light, each of a first detection signal, a second detection signal, a third detection signal and a fourth detection signal at each $\pi/2$ phase of the modulated light. A first sum of the first detection signal and the third detection signal and a second sum of the second detection signal and the fourth detection signal are calculated and whether or not a difference between the first sum and the second sum is smaller than a set value is determined. If it is determined that the difference between the first sum and the second sum is smaller than the set value, a phase difference between the modulated light and the reflected modulated light is detected based on the four types of detection signals obtained by the light receiving section, and a distance to the subject is calculated from the detected phase difference. In this manner, if any of the four types of detection signals is an abnormal signal, such as a detection signal which is obtained in a state where external light enters the light receiving section or a detection signal which is obtained from the reflected modulated light being reflected from a different position of the subject, the distance is not calculated, thereby preventing erroneous distance measurement.

It should be noted that, in the case where the light receiving section includes first light receiving elements for obtaining the first detection signal, second light receiving elements for obtaining the second detection signal, third light receiving elements for obtaining the third detection signal, and fourth light receiving elements for obtaining the fourth detection signal, and obtains one frame image containing the four types of detection signals from the light receiving elements, the determining section determines whether or not the difference between the first sum and the second sum is smaller than the set value using the four types of detection signals obtained for each block formed by four light receiving elements in the one frame image, and the distance calculating section calculates the distance for each block, the distance can be calculated from the one frame image, thereby allowing speeding up of the distance calculation.

Further, in the case where the light receiving section includes first light receiving elements and second light receiving elements, and obtains the four types of detection signals by obtaining frame images, each containing two types of the detection signals obtained by the first light receiving elements and the second light receiving elements and obtaining two different types of the frame images, the determining section determines whether or not the difference between the first sum and the second sum is smaller than the set value using the four types of detection signals obtained for each block formed by the first light receiving element and the second light receiving element, and the distance calculating section calculates the distance for each block, the distance can be calculated for each block of two pixels from the two frame images, thereby allowing speedy generation of the distance image with a higher resolution.

Furthermore, in the case where the light receiving section includes two-dimensionally arrayed light receiving elements, and obtains the four types of detection signals by obtaining four frame images each containing one type of the four types of detection signals obtained by the light receiving elements, the determining section determines whether or not the difference between the first sum and the second sum is smaller than the set value using the four types of detection signals obtained for each light receiving element, and the distance calculating section calculates the distance for each light receiving element, the distance can be calculated by obtaining the four types of detection signals from each one of the light receiving elements, thereby allowing generation of the distance image with a higher resolution.

Moreover, in the case where the determining section sets, as the set value, a predetermined ratio of a value of larger one of the first sum and the second sum, or sets, as the set value, a predetermined ratio of an average of the first sum and the second sum, an appropriate set value can be set in such a case where noise, such as shot noise, which has larger variation correspondingly to the amount of exposure is present.

What is claimed is:

1. A distance measuring device comprising:
  a light emitting section for emitting intensity-modulated light being modulated with a constant cycle;
  a light receiving section for receiving reflected modulated light from the subject when the subject is illuminated by the modulated light emitted from the light emitting section to obtain, from the reflected modulated light, each of a first detection signal, a second detection signal, a third detection signal and a fourth detection signal at each $\pi/2$ phase of the modulated light;
  a determining section for calculating a first sum of the first detection signal and the third detection signal and a second sum of the second detection signal and the fourth detection signal obtained by the light receiving section and determining whether or not a difference between the first sum and the second sum is smaller than a set value; and
  a distance calculating section for detecting a phase difference between the modulated light and the reflected modulated light based on the four types of detection signals obtained by the light receiving section and calculating a distance to the subject, if it is determined by the determining section that the difference between the first sum and the second sum is smaller than the set value, wherein
  the light receiving section comprises first light receiving elements for obtaining the first detection signal, second light receiving elements for obtaining the second detection signal, third light receiving elements for obtaining the third detection signal, and fourth light receiving elements for obtaining the fourth detection signal, and obtains the four types of detection signals from the light receiving elements as one frame image,
  the determining section determines whether or not the difference between the first sum and the second sum is smaller than the set value using the four types of detection signals obtained for each block formed by the four types of light receiving elements in the one frame image, and the distance calculating section calculates the distance for each block.

2. A distance measuring device comprising:

a light emitting section for emitting intensity-modulated light being modulated with a constant cycle;

a light receiving section for receiving reflected modulated light from the subject when the subject is illuminated by the modulated light emitted from the light emitting section to obtain, from the reflected modulated light, each of a first detection signal, a second detection signal, a third detection signal and a fourth detection signal at each $\pi/2$ phase of the modulated light;

a determining section for calculating a first sum of the first detection signal and the third detection signal and a second sum of the second detection signal and the fourth detection signal obtained by the light receiving section and determining whether or not a difference between the first sum and the second sum is smaller than a set value; and a distance calculating section for detecting a phase difference between the modulated light and the reflected modulated light based on the four types of detection signals obtained by the light receiving section and calculating a distance to the subject, if it is determined by the determining section that the difference between the first sum and the second sum is smaller than the set value, wherein the light receiving section comprises first light receiving elements and second light receiving elements each obtaining the detection signals of types different from each other, and obtains the four types of detection signals by obtaining two types of the detection signals obtained by the first light receiving elements and the second light receiving elements as one frame image and obtaining two different types of the frame images, the determining section determines whether or not the difference between the first sum and the second sum is smaller than the set value using the four types of detection signals obtained for each block formed by the first light receiving element and the second light receiving element, and the distance calculating section calculates the distance for each block.

3. A distance measuring device comprising:

a light emitting section for emitting intensity-modulated light being modulated with a constant cycle;

a light receiving section for receiving reflected modulated light from the subject when the subject is illuminated by the modulated light emitted from the light emitting section to obtain, from the reflected modulated light, each of a first detection signal, a second detection signal, a third detection signal and a fourth detection signal at each $\pi/2$ phase of the modulated light;

a determining section for calculating a first sum of the first detection signal and the third detection signal and a second sum of the second detection signal and the fourth detection signal obtained by the light receiving section and determining whether or not a difference between the first sum and the second sum is smaller than a set value; and a distance calculating section for detecting a phase difference between the modulated light and the reflected modulated light based on the four types of detection signals obtained by the light receiving section and calculating a distance to the subject, if it is determined by the determining section that the difference between the first sum and the second sum is smaller than the set value, wherein the light receiving section comprises two-dimensionally arrayed light receiving elements, and obtains the four types of detection signals by obtaining four frame images each containing one type of the four types of detection signals obtained by the light receiving elements, the determining section determines whether or not the difference between the first sum and the second sum is smaller than the set value using the four types of detection signals obtained for each light receiving element, and the distance calculating section calculates the distance for each light receiving element.

4. A distance measuring device comprising:

a light emitting section for emitting intensity-modulated light being modulated with a constant cycle;

a light receiving section for receiving reflected modulated light from the subject when the subject is illuminated by the modulated light emitted from the light emitting section to obtain, from the reflected modulated light, each of a first detection signal, a second detection signal, a third detection signal and a fourth detection signal at each $\pi/2$ phase of the modulated light;

a determining section for calculating a first sum of the first detection signal and the third detection signal and a second sum of the second detection signal and the fourth detection signal obtained by the light receiving section and determining whether or not a difference between the first sum and the second sum is smaller than a set value; and a distance calculating section for detecting a phase difference between the modulated light and the reflected modulated light based on the four types of detection signals obtained by the light receiving section and calculating a distance to the subject, if it is determined by the determining section that the difference between the first sum and the second sum is smaller than the set value., wherein the determining section sets, as the set value, a predetermined ratio of a value of larger one of the first sum and the second sum.

5. A distance measuring device comprising:

a light emitting section for emitting intensity-modulated light being modulated with a constant cycle;

a light receiving section for receiving reflected modulated light from the subject when the subject is illuminated by the modulated light emitted from the light emitting section to obtain, from the reflected modulated light, each of a first detection signal, a second detection signal, a third detection signal and a fourth detection signal at each $\pi/2$ phase of the modulated light;

a determining section for calculating a first sum of the first detection signal and the third detection signal and a second sum of the second detection signal and the fourth detection signal obtained by the light receiving section and determining whether or not a difference between the first sum and the second sum is smaller than a set value; and a distance calculating section for detecting a phase difference between the modulated light and the reflected modulated light based on the four types of detection signals obtained by the light receiving section and calculating a distance to the subject, if it is determined by the determining section that the difference between the first sum and the second sum is smaller than the set value., wherein the determining section sets, as the set value, a predetermined ratio of an average of the first sum and the second sum.

* * * * *